Aug. 6, 1957 L. J. MATTINGLY 2,802,140

TELEVISION RECEIVER SIZE CONTROL

Filed June 26, 1953

INVENTOR.
LAWRENCE J. MATTINGLY
BY
Foorman L. Mueller
ATTY.

United States Patent Office 2,802,140 Patented Aug. 6, 1957

2,802,140

TELEVISION RECEIVER SIZE CONTROL

Lawrence J. Mattingly, Lombard, Ill., assignor to Motorola, Inc., Chicago, Ill., a corporation of Illinois Application June 26, 1953, Serial No. 364,384

1 Claim. (Cl. 315—27)

The present invention relates to television receivers and more particularly to an improved and simplified arrangement for controlling the size of at least one dimension of the image reproduced by the television receiver.

Most present-day receivers incorporate suitable manual controls for adjusting the height and width of the image reproduced by the reproducing device of the receiver. The width control is usually in the form of a variable inductance coil connected in the output circuit of the horizontal deflection system associated with the reproducing device. By means of such a variable inductance coil, it is possible to control manually the horizontal size of the reproduced image without influencing materially the high voltage which is also derived from the horizontal deflection system. This high voltage is applied to the accelerating electrode of the image reproducing device to provide an accelerating field for the cathode ray beam therein and should have a constant value. Such prior arrangements using variable inductance coils to provide a width, or horizontal size, control have been found to be satisfactory but are relatively expensive.

It is, accordingly, an object of the present invention to provide an improved and simplified device that may be incorporated in the horizontal or vertical deflection system of a television receiver for controlling the horizontal or vertical size of the reproduced image and which, when included in the horizontal deflection system, does not affect materially the high voltage developed by the horizontal deflection system.

Another object of the invention is to provide such an improved size control that is relatively inexpensive and which can be mounted in a simple and convenient manner in a television receiver.

A feature of the present invention is the provision in a television receiver of a permanent magnet associated with the magnetic core of the output transformer of the horizontal or vertical deflection system, the magnet being movable relative to the core to control the saturation of the core, and thus, the horizontal or vertical size of the reproduced image.

The above and other features of the invention which are believed to be new are set forth with particularity in the appended claim. The invention itself, however, together with further objects and advantages thereof, may best be understood by reference to the following description when taken in conjunction with the accompanying drawing in which:

Figures 1, 2:
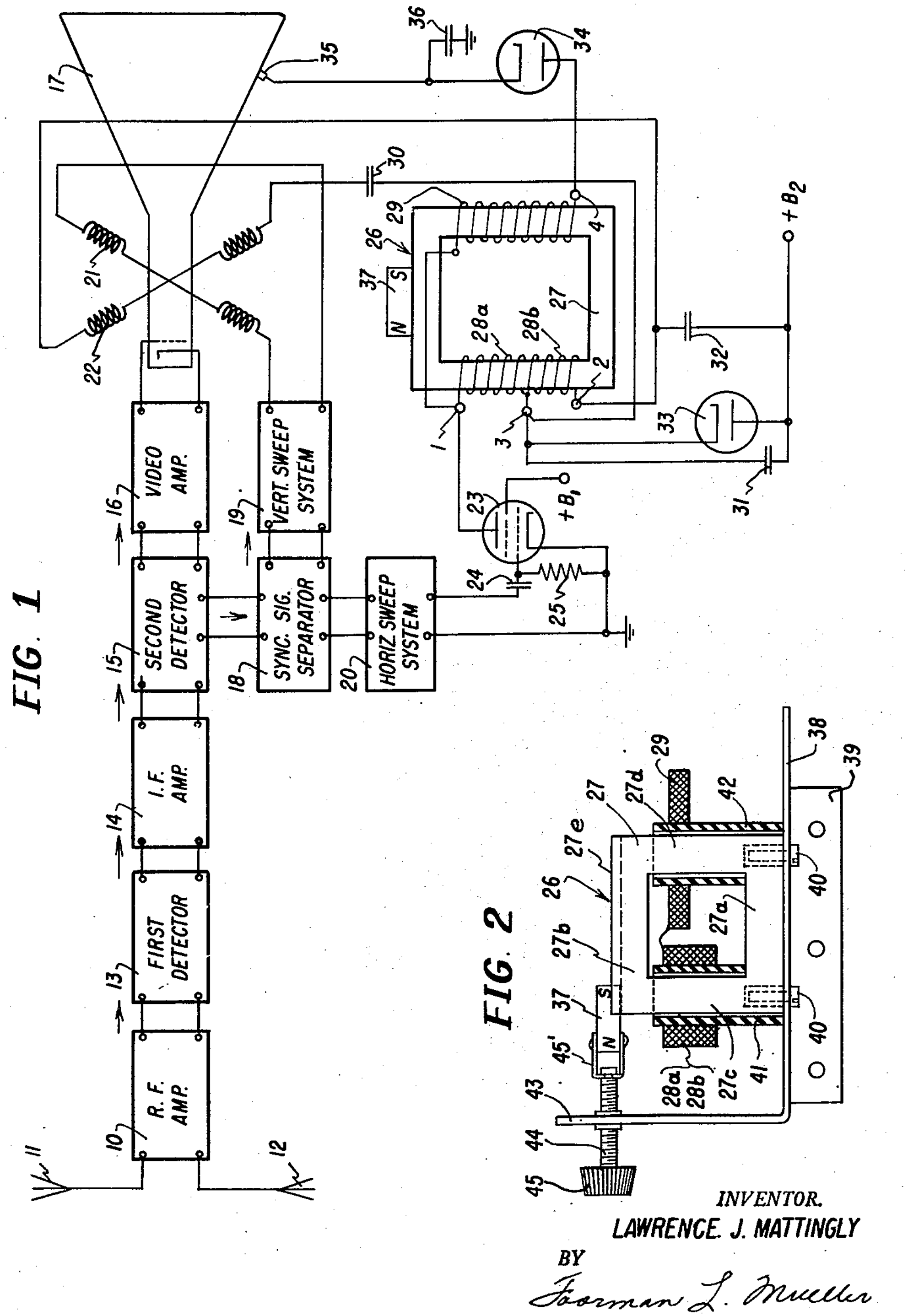
Figure 1 shows a television receiver incorporating the invention.
Figure 2 is a mechanical representation of one embodiment of the invention.

The invention provides a transformer assembly for use in a circuit for providing beam deflecting current for a cathode ray tube. The assembly comprises a magnetic core with windings disposed on the core and inductively coupled one to another. A permanent magnet is mounted adjacent the core and has a magnetic field extending into and tending either to saturate the core or to oppose saturating direct current flux in the core to decrease the saturation of the core. The permanent magnet is movable relative to the core to control the amount of saturation of the core. In this manner, the inductive coupling between the windings is controlled which, in turn, controls the size of the reproduced image.

The television receiver of Figure 1 includes a radio frequency amplifier 10 having input terminals connected to an appropriate antenna circuit 11, 12 and output terminals connected through a first detector 13 to an intermediate frequency amplifier 14. Intermediate frequency amplifier 14 is coupled to a second detector 15 which, in turn, is coupled through a video amplifier 16 to the input electrodes of a cathode ray image reproducing device 17. Second detector 16 is also coupled to a synchronizing signal separator 18 which has output terminals connected to a vertical sweep system 19 and to a horizontal sweep system 20. The output terminals of vertical sweep system 19 are connected to the vertical deflection coils 21 of reproducing device 17, and the output terminals of horizontal sweep system 20 are connected to the horizontal deflection coils 22 of the reproducing device through an output circuit which is to be described in detail.

When the receiver is tuned to a television signal intercepted by antenna circuit 11, 12, such signal is amplified by radio frequency amplifier 10. The amplified signal is heterodyned in first detector 13 to the selected intermediate frequency of the receiver, and the resulting intermediate frequency signal is amplified in intermediate frequency amplifier 14 and applied to second detector 15. Second detector 15 demodulates the amplified intermediate frequency signal and produces a composite video signal which includes video components and vertical and horizontal synchronizing components. The composite video signal is amplified in video amplifier 16 and applied to the input electrode of reproducing device 17 to control the intensity of the cathode ray beam therein in accordance with the video intelligence.

The synchronizing components of the composite video signal are separated from the signal in separator 18, the vertical synchronizing components being used to synchronize vertical sweep system 19 and the horizontal synchronizing components being used to synchronize horizontal sweep system 20. In this manner, the horizontal and vertical sweep systems deflect the cathode ray beam in the reproducing device in synchronism with the received television signal.

In the manner described above, the television receiver reproduces the televised information on the screen of image reproducing device 17. The sound portion of the television receiver forms no part of the present invention and, for that reason, has not been shown.

The present invention is directed particularly to a size control device that may conveniently be included in the output circuit of the horizontal sweep system and which will be described in conjunction with that circuit. It will be apparent, however, that a similar arrangement could also be incorporated into the vertical sweep system to control the vertical size of the reproduced images.

One of the output terminals of the horizontal sweep system 20 is coupled to the control electrode of an electron discharge amplifier device 23 through a coupling capacitor 24. The control electrode is connected to ground through a grid-leak resistor 25. The other output terminal of the horizontal sweep system is connected to ground. Device 23 functions as an output amplifier for the horizontal deflection sawtooth voltage signal developed by the horizontal sweep system, and the device includes a cathode connected to ground, a screen electrode connected to the positive terminal $+B_1$ of a unidirectional potential source, and an anode connected to the terminal 1 of an output coupling transformer 26.

Coupling transformer 26 includes a core 27 of a suitable magnetic material, and the core has elongated base and top sections and a pair of spaced parallel elongated side sections interconnecting the extremities of the top and base sections. A first winding is disposed on one of the elongated side sections of core 27 and includes a section **28*a* connected to terminals 1 and 3. A second winding section 28*b* is also disposed on this side section and connected between terminals 2 and 3 and in series with winding section 28*a*. A second winding 29 is disposed on the other side section of core 27 and connected between terminals 1 and 4 and in series with winding sections 28*a* and 28*b*. Transformer 26 is, therefore, connected as an auto transformer with winding 28*a*, 28*b* forming the primary winding section; winding 28*b* forming the sweep secondary winding; and windings 28*a*, 28*b* and 29** forming the high voltage secondary of the transformer.

The anode of device 23 is connected to the positive terminal $+B_2$ through terminal 1, primary winding **28*a*, 28*b*, terminal 2, and a capacitor 32. The horizontal deflection coils 22 of device 17 are connected across sweep secondary winding section 28*b* through a capacitor 30 and terminals 2 and 3. A damper diode 33 has its anode directly connected to the positive terminal $+B_2$ and its cathode connected to terminal 3 (the common junction of winding sections 28*a*, 28*b*). Diode 33 is bridged by a capacitor 31. Accelerating voltage is supplied to terminal 35 of reproducing device 17 through a diode rectifier 34, the anode of this device being connected to terminal 4 and the cathode being coupled to ground through capacitor 36**.

The above described output circuit merely represents a typical circuit to which the present invention may be applied and, in itself, forms no part of the present invention. The operation of the output circuit briefly is as follows:

Sweep system 20 develops a sawtooth horizontal deflection voltage wave which is amplified in device 23 to produce a sawtoothed current wave in primary winding **28*a*, 28*b*. The sawtooth current wave in the primary winding is stepped up in sweep secondary winding section 28*b* by well known auto transformer action, and the stepped up sawtooth current wave is supplied to the horizontal deflection coils 22 coupled across this secondary. Damper diode 33 performs a well known function in damping oscillations in the output circuit and is also instrumental in developing a bootstrap voltage across capacitor 32, the bootstrap voltage together with the voltage of positive terminal $+B_2$ are supplied to the anode of device 23 through primary winding 28*a*, 28*b*** to provide increased excitation for the device.

During horizontal retrace intervals, voltage pulses are developed across primary winding **28*a*, 28*b* and these are induced in the high voltage secondary winding 28*a*, 28*b* and 29 and rectified by diode device 34. Device 34, in conjunction with capacitor 36, develops a high voltage uni-directional accelerating potential for reproducing device 17**.

In accordance with the invention, a permanent magnet 37 is mounted adjacent core 27 and has a magnetic field which enters the core. The polarity of this magnet may be such that its field tends to saturate the core. Alternately, the direct current flux produced in the core by the winding may be made such that this flux tends to saturate the core. The polarity of the magnet is then chosen so that the field from the magnet opposes the direct current flux and tends to decrease the saturation of the core. Any tendency for the core to saturate varies the inductive coupling between the primary and sweep secondary winding sections of transformer 26 which varies the amplitude of the sweep signal in deflection coil 22 and results in a variation of the horizontal size of the image reproduced by device 17. In each of the instances mentioned above, the field from the magnet controls this tendency for the core to saturate and, hence, the size of the reproduced image. It is preferable that magnet 37 be of the permanent magnet bar type, and the bar magnet is mounted on the elongated top member of core 27 of transformer 26. A suitable means is provided sliding the bar magnet along the top member to achieve the desired size control.

A suitable mounting arrangement for transformer 26 and magnet 37 is shown in Figure 2. The magnetic core 27 of the transformer is mounted on a suitable mounting plate 38 which, in turn, is mounted in the television receiver on a bracket 39. The core 27 is affixed to the mounting plate by a pair of screws 40 threaded through the plate into the core. These screws secure the core to the mounting plate with the elongated base section **27*a* of the core extending along the mounting plate, the elongated top section 27*b* extending in spaced parallel relation to the mounting plate, and the respective elongated side sections 27*c* and 27*d* extending perpendicularly upward from the mounting plate and interconnecting the extremities of the base and top members. The core 27** may be constructed in any well known manner and it is believed that a further explanation of the details thereof are unnecessary herein.

Side member **27*c* of the core has a tubular mounting member 41 of insulating material disposed thereon, and member 41 carries winding 28*a*, 28*b* previously referred to in conjunction with Figure 1. Side member 27*d* of the core, likewise, has an insulating tubular supporting member 42 mounted thereon which carries the winding 29**.

Mounting plate 38 includes a side bracket 43 through which a control shaft 44 is threaded and which has a control knob 45 affixed to its outer extremity. Rotation of control knob 45 causes control shaft 44 to move longitudinally toward and away from the elongated top member **27*d* of the core 27. Core 27 is preferably formed with a pair of outer ridges 27*e* in spaced parallel relation which form a channel to prevent rotation of bar magnet 37 and yet enable the bar magnet to slide along the top member of the core. The bar magnet is coupled to shaft 44 through a suitable coupling bracket 45 secured to one end of the magnet and rotatably mounted on drive shaft 44**.

With the arrangement of Figure 2, rotation of drive shaft 44 moves magnet 37 from one side of top member **27*b* along the top member in the channel formed by ridges 27*e* to vary the amount of flux from bar magnet 37 entering magnetic core 27**. In this manner, the tendency of the core to saturate may be controlled which, in turn, controls the inductive coupling between the winding so as to adjust the horizontal size of the reproduced image.

The controlled saturation of the core has been found to have a much greater effect on the inductive coupling between primary winding **28*a*, 28*b* and sweep secondary winding section 28*b*** than it has on the inductive coupling between the primary windings and the high voltage secondary. Because of this, the device is suitable to control the horizontal size of the reproduced image and yet has no material effect on the high voltage developed by the horizontal deflection system. Therefore, the invention provides a simple and convenient control for the size of the reproduced image which does not affect the accelerating potential supplied to the reproducing device to any appreciable extent.

It is to be noted that the arrangement in Figure 2 shows merely a suitable arrangement for controlling the bar magnet 37 and is not intended to limit the invention in any way. The bar magnet may be mounted and moved in any suitable manner and with any degree of motion relative to core 27, its only function being to vary the flux within the core so as to control the saturation thereof.

The invention provides, therefore, an exceedingly simple and inexpensive arrangement that may be conveniently incorporated into the deflection system of a television receiver to provide a manual control for the size of the reproduced image. As previously stated, the device has been described as incorporated into the horizontal deflection system of the receiver in which it finds its greatest utility. However, a similar arrangement could be incorporated in the vertical deflection system of the receiver in conjunction with the vertical output transformer size of the reproduced image.

Therefore, while a particular embodiment of the invention has been shown and described, modifications may be made and it is intended in the appended claim to cover all such modifications as fall within the true spirit and scope of the invention.

I claim:

In a television receiver which includes a cathode ray image reproducing device with deflection coils therefor and an amplifier for the deflection signal, a television receiver sweep system for supplying a deflection signal to the deflection coils and for supplying a unidirectional accelerating potential to the image reproducing device, said system including in combination, a magnetic core having elongated base and top sections and a pair of spaced parallel elongated side sections interconnecting the extremities of the top and base sections, a first winding disposed on one of said elongated side sections including first and second sections connected in series, a second winding disposed on the other of said elongated side sections series connected to and inductively coupled to said first winding, means coupling the amplifier to said first winding to apply the deflection signal thereto, one of said winding sections being adapted to be connected to the deflection coils of the reproducing device to supply deflection current thereto, said first and second sections of said first winding providing a first auto transformer action for stepping up current supplied to the deflection coils, a rectifying circuit for producing the accelerating potential connected to said first and second windings in series, said first and second windings providing a second auto transformer action for stepping up the voltage applied to said rectifying circuit, a permanent magnet slidably mounted on said elongated top section of said core, and means for reciprocally moving said permanent magnet along said top section and transverse of said one elongated side section to vary the inductive coupling between said first and second sections of said first winding and control the amplitude of the deflection current supplied to the deflection coils of the reproducing device without substantially affecting the inductive coupling between said first and second windings and the accelerating potential developed thereacross.

References Cited in the file of this patent

UNITED STATES PATENTS

| | | |
|---|---|---|
| 2,451,026 | Friend | Oct. 12, 1948 |
| 2,476,854 | Friend | July 19, 1949 |
| 2,621,314 | Wendt | Dec. 9, 1952 |
| 2,644,104 | Fyler et al. | June 30, 1953 |
| 2,724,075 | Van Urk et al. | Nov. 15, 1955 |